United States Patent [19]

Kim et al.

[11] Patent Number: 5,293,252
[45] Date of Patent: Mar. 8, 1994

[54] METHOD OF COMPRESSING DIGITAL IMAGE DATA AND DEVICE THEREOF

[75] Inventors: Jong-Kug Kim, Taeku; Min-Seok Hong, Suwon; Tae-Eung Kim, Seoul, all of Rep. of Korea

[73] Assignee: SamSung Electronics Co., Ltd., Kyungki, Rep. of Korea

[21] Appl. No.: 845,701

[22] Filed: Mar. 4, 1992

[30] Foreign Application Priority Data

Mar. 27, 1991 [KR] Rep. of Korea ............... 1991-4791

[51] Int. Cl.$^5$ ............................................. H04N 1/415
[52] U.S. Cl. ................................... 358/432; 358/427
[58] Field of Search .............. 358/426, 261.1, 261.2, 358/427, 432, 433, 133

[56] References Cited

U.S. PATENT DOCUMENTS

| | | |
|---|---|---|
| 4,677,479 | 6/1987 | Hatori et al. . |
| 4,920,426 | 4/1990 | Hatori et al. . |
| 5,051,840 | 9/1991 | Watanabe et al. . |
| 5,113,256 | 5/1992 | Citta et al. . |
| 5,126,857 | 6/1992 | Watanabe et al. ............ 358/433 |
| 5,150,433 | 9/1992 | Daly . |
| 5,162,908 | 11/1992 | Kim .............................. 358/133 |
| 5,196,946 | 3/1993 | Balkanski et al. ............ 358/433 |

*Primary Examiner*—Bentsu Ro
*Attorney, Agent, or Firm*—Robert E. Bushnell

[57] ABSTRACT

A method of compressing digital image data and a device thereof of coding digital image data within constant rate data not deteriorating a resolution of an image without regard to a complexity of digital image data. A format of M×N pixel blocks (where M, N are natural numbers) is made from luminance and sub-sampled chrominance signals, and first to fourth edge values TY, TR-Y, TB-Y, Ai respectively from the luminance, sub-sampled signals and the blocks are detected. A quantization scaling factor is determined by normalizing the first edge value, and the number of bits corresponding to the each block is allocated according to the first to fourth edge values. The number of AC (alternating current) factor bits is allocated by subtracting the number of DC (direct current) factor bits of the each block coded by a one-dimensional Huffman coding from the number of the allocation bits.

26 Claims, 1 Drawing Sheet

METHOD OF COMPRESSING DIGITAL IMAGE DATA AND DEVICE THEREOF

BACKGROUND OF THE INVENTION

This invention relates to a method of compressing digital image data and a device thereof for a digital image recording device, and more particularly to a method of compressing digital image data and a device thereof capable of coding the digital image data within predetermined constant rate data.

Generally, there is disclosed a device for recording a color still image converted into digital data on a recording media such as a magnetic tape or an integrated circuit (IC) card.

The digital image data is formed properly as a plurality of blocks for performing a conversion-coding such as a discrete cosine transform (DCT) in such digital image recording device. The blocks is produced by dividing an original image by a unit of 8×8 pixels or 16×16 pixels. A conversion factors are produced by applying the DCT conversion coding to the blocks. The conversion factors are Huffman-coded and variable-length-coded through a proper quantization. A union group JPEG (Joint Photographic Experts Group) of the CCITT (Consultative Committee on International Telegraphy and Telephony) and the ISO (International Standard Organization) recommended the method of compressing and coding the digital image data by the above described steps on Feb. 1990.

The conventional method described as above has a problem that a quantity of compressed data is changed according to a complexity of an input digital image data. Especially, it is not desirable that the quantity of digital image data is changed in a still video camera for compressing and recording digital data on a record media such as an IC card because the number of scenes of a digital image recorded on the IC card may be changed according to a complexity of the input image contents.

Therefore, a user experiences an inconvenience since the number of scenes to be recorded on one IC card made of static random access memory (SRAM) is not predictable.

SUMMARY OF THE INVENTION

An object of this invention is to provide a method of compressing a digital image data and a device thereof to generate a constant rate data without regard to a complexity of input digital image data, within the extent of not deteriorating a resolution of an image.

Another object of this invention is to provide a method of compressing digital image data and a device thereof for coding a digital image data within predetermined constant rate data.

Still another object of this invention is to provide a digital image recording device for a convenient use.

According to an aspect of the present invention, a format of M×N pixel blocks (where M, N are natural numbers) is made from luminance and sub-sampled chrominance signals, and first to fourth edge values TY, TR-Y, TB-Y, Ai respectively from the luminance, sub-sampled signals and the blocks are detected. A quantization scaling factor is determined by normalizing the first edge value, and the number of bits corresponding to the each block is allocated according to the first to fourth edge values. The number of AC (alternating current) factor bits is allocated by subtracting the number of DC (direct current) factor bits of the each block coded by a one-dimensional Huffman coder from the number of the allocation bits.

BRIEF DESCRIPTION OF DRAWINGS

For a better understanding of the invention and to show how the same may be carried into effect, reference will now be made, by way of example, to the accompanying diagrammatic drawings, in which.

DETAILED DESCRIPTION OF CERTAIN PREFERRED EMBODIMENTS

Figure 1:
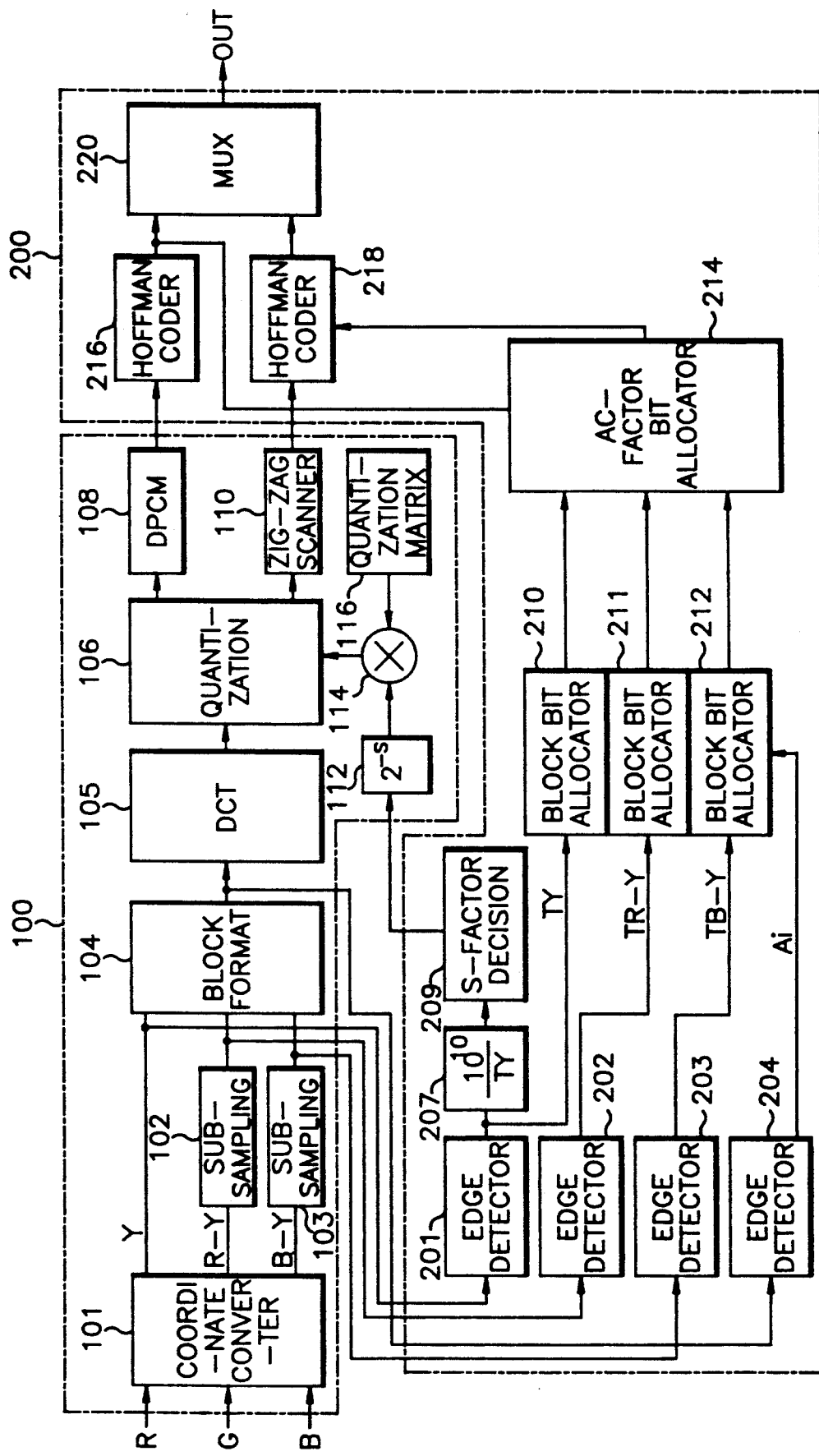
FIG. 1 is a block diagram of a digital image data compression device according to this invention.

Referring to FIG. 1, a coding circuit according to a digital image compression coding method of JPEG described above, has a coding circuit 100, first and second Huffman coding circuits 216, 218 and a multiplexer 220. A detection circuit has a first edge detector 201 for detecting an edge component of a luminance signal Y, second and third edge detectors 202, 203 for detecting an edge component of each sub-sampled chrominance signal R-Y, B-Y and a fourth edge detector 204 for detecting an edge component of blocks. A decision circuit has a normalization circuit 207 for normalizing an edge component detection value TY of the luminance signal Y detected by the detection circuit to $$\frac{10^{10}}{Ty}$$

and a S-factor decision circuit 209 for determining a scaling factor S of a quantization according to a normalization value from the normalization circuit 207. A quantization circuit 106 of the coding circuit 100 quantizes conversion factors which is DCT-processed in two-dimension by a DCT circuit 105, according to an output signal from the S-factor decision circuit 209. Since quantization is performed by multiplying a quantization matrix by $2^{-S}$, a compression ratio of data is inversely proportional to the scaling factor S.

A block bit allocation circuit allocates bits corresponding to each block, according to the edge detection values TY, TR-Y, TB-Y and Ai from the fist to fourth edge detectors. The block bit allocation circuit has first to third block bit allocators 210, 211, 212. The first block bit allocator 210 multiplies AL (A is predetermined image compression bits and L is an allocation constant of the luminance signal) by a value of dividing the block edge detection value Ai detected by the fourth edge detector 204 by the luminance signal edge detection value TY detected by the first edge detector 201. The second block bit allocator 211 multiplies AM (A is the predetermined image compression bits and M is an allocation constant of the chrominance signal R-Y) by a value of dividing the block edge detection value Ai by the chrominance signal edge detection value TR-Y detected by the second edge detector 202. The third block bit allocator 212 multiplies AN (A is the predetermined image compression bits and N is an allocation constant of the chrominance signal B-Y) by a value of dividing the block edge detection value Ai by the chrominance signal edge detection value TB-Y detected by the third edge detector 203.

An AC factor bit allocator 214 allocates AC factor bits by subtracting DC factor bits of each block coded by one-dimensional Huffman coding from the number of bits allocated by the block bit allocation circuit and supplies the allocated bits to the second Huffman coder circuit 218. The second Huffman coder 218 receiving a signal output from a zig-zag scanner 110, codes the AC factor of block as many as the number of bits received from the AC factor bit allocator 214 during the two-dimensional Huffman coding.

A desirable embodiment of the invention is described hereinafter according to the above stated structure.

Referring FIG. 1, an original digital chrominance signal R, G, B (red, green and blue) are transmitted as a luminance signal Y and chrominance signals B-Y, R-Y by a coordinate converter 101. The original chrominance signals R, G, B supplied to the coordinate converter 101 is generated from a CCD (Charge Coupled Device). The luminance and chrominance signals output from the coordinate converter 101 are expressed as a determinant as follow.

$$\begin{vmatrix} Y \\ R-Y \\ B-Y \end{vmatrix} = \begin{vmatrix} 0.299 & 0.587 & 0.114 \\ 0.701 & -0.587 & -0.114 \\ -0.299 & -0.587 & 0.886 \end{vmatrix} \begin{vmatrix} R \\ G \\ B \end{vmatrix} \quad (1)$$

In the equation (1), the size of image data corresponding to each component may be set as 720 H×480 V (H is a pixel in a horizontal direction and V is a pixel in a vertical direction). Since the luminance signal Y from the coordinate converter 101 has a concentrated energy, the chrominance signals R-Y, B-Y should be sub-sampled point-sequentially. Therefore, the chrominance signals R-Y, B-Y are transmitted as the size of 360 H×480 V by first and second sub-sampling circuits 102, 103, respectively. A block format circuit 104 divides each component into blocks of 8×8 pixels in order of components R-Y, B-Y, and Y for performing a conversion coding. Accordingly, the luminance signal of 720 H×480 V pixels is divided into 90×60 blocks, the sub-sampled chrominance signal R-Y, B-Y of 360 H×480 V pixels is divided into 45×60 blocks, respectively, so that the number of total blocks is 10,800.

The first edge detector 201 detects an edge component from the luminance signal Y, the second edge detector 202 detects an edge component from the chrominance signal R-Y sub-sampled by the first sub-sampling circuit 102 and the third edge detector 203 detects an edge component from the chrominance signal B-Y sub-sampled by the second sub-sampling circuit 103. The fourth edge detector 204 detects an edge component of blocks by the block format circuit 104. In this case, the detection of the edge components is performed by utilizing a gray level and direction between adjacent pixels. The edge detection values from the first to fourth edge detectors 201, 202, 203, 204 are referred to as TY, TR-Y, TB-Y and Ai, respectively.

The blocks output from the block format circuit 104 is sequentially DCT-converted by DCT circuit 105 in two-dimension. The two-dimensional DCT conversion concentrates an energy distributed to all pixels into several conversion factors of low frequency including DC factor.

Since the level of the chrominance signals R-Y, B-Y is from −128 to +128, the level of the DC factor out of conversion factors is from −1024 to +1023, and since the level of the luminance signal Y is from 0 to 255, the DC factor of the converted signals is different from that of the chrominance signals R-Y, B-Y. Accordingly, the two-dimensional DCT should be performed after adding the value of −128 to the luminance signal Y in order that the level of two chrominance and luminance signal might be the same.

A quantization circuit 106 quantizes linearly the conversion factors from the DCT circuit 105 according to a quantization step size Q supplied by a multiplier 114. The quantization step size Q is expressed as follows.

$$Q = QM \times 2^{-S} \quad (2)$$

In this case, the QM is a quantization matrix 116 and the S is a scaling factor. It is desirable that a value recommended by the JPEG is used as a value of the quantization matrix 116. The factor output from the quantization circuit 106 depends on the scaling factor and is related to a picture quality. The normalization circuit 207 divides a predetermined value $10^{10}$ by luminance signal edge detection value TY to transmits its result to a S-factor decision circuit 209. The S-factor decision circuit 209 determines a scaling factor of the quantization circuit 106 according to the normalization value. In this case, assuming that the total number of bits of the luminance and the chrominance signals Y, R-Y, B-Y is 5400 kilo-bits, it comes to 675 kilo-bits by compressing by ⅛ and it comes to 37.5 kilo-bits by compressing by 1/16. Accordingly an input image should have a compression ratio of ⅛ or 1/16 according to a normalization value of the input image luminance signal in order to complete a data compression within predetermined constant rate bits for any input image, and it is directly related to a determined value of the scaling factor. The scaling factor is within a value of 5.12 which is divided by an interval 0.02 to turn into 256 pieces. Consequently the scaling factor value is determined to a higher value between 0 and 5.12 in case of the normalization value being high and to a lower value therebetween in case of the normalization value being low.

Among the factors quantized linearly by the quantization circuit 106, the DC factor is transmitted to the DPCM (differential pulse code modulation) circuit 108 and the AC factor is transmitted to the zig-zag scanner 110. The DPCM circuit 108 codes the DC factor by the one-dimensional prediction coding and transmits it to the first Huffman coder 216, and the zig-zag scanner 110 scans the AC factors in a zig-zag and transmits it to the second Huffman coder 213.

The edge detection values TY, TR-Y, TB-Y are transmitted to the first to third block bit allocators 210, 211, 212 respectively, and the block edge detection value Ai is transmitted commonly to the first to third block bit allocators 210 to 212. The first block bit allocator 210 allocates bits for block on the basis of an equation of $$\frac{Ai}{TY} \times AL,$$

here, the predetermined image compression bits A and the allocation constant L of the luminance signal Y may be set to 337.5 kilobits and 0.76 respectively, in case of the compression ratio being 1/16. The second block bit allocator 211 allocates bits for block on the basis of an equation of $$\frac{Ai}{TR-Y} \times AM,$$

here, the predetermined image compression bits A and the allocation constant M of the chrominance signal TR-Y may be set to 337.5 kilo-bits and 0.11 respectively, in the case of the compression ratio being 1/16. The third block bit allocator 212 allocates bits for block on the basis of an equation of $$\frac{Ai}{TB-Y} \times AN,$$

here, the predetermined image compression bits A and the allocation constant N of the chrominance signal TB-Y may be set to 337.5 kilo-bits and 0.13 respectively, in the case of the compression ratio being 1/16. The percentage of allocating bits for each component block is Y:R-Y:B-Y=76:11:13, which is formed experimentally by a statistical analysis.

It should be understood that the edge detection value of block is a factor for judging an extent of complexity of the block during allocating bits, therefore, bits for each block are allocated adaptively.

The signal bit-allocated by the first to third block bit allocators 210 to 212 is transmitted to the AC factor bit allocator 214. The AC factor bit allocator 214 subtracts the DC factor bits of each block coded by the first Huffman coder 216 from the allocated bits and transmits its result to the second Huffman coding circuit 218. The reason why the DC factor bits are subtracted from the bits allocated to the AC factor is that the DC factor is an important information for expressing a brightness of the block. Accordingly the bits allocated for coding the AC factor should be a quantity from which the DC factor bits is subtracted.

When the second Huffman coder 218 codes signal from the zig-zag scanner 110 by the two-dimensional Huffman coding, it terminates coding for the rest AC factor in case of the bits encoded by the second Huffman coder 218 exceeding the bits allocated by the AC factor bit allocator 214. In case of the encoded bits being less than the bits allocated by the AC factor bit allocator 214, surplus encoded bits is added to allocated bits of a next block, to thereby reduce the bit truncation error. A multiplexer 220 multiplexes the coded DC factor from the first Huffman coder 216 and the coded AC factor from the second Huffman coder 218 to store the signal therefrom in an IC card made of a SRAM.

Consequently, input image data may be compressed within predetermined constant rate data, i.e., 337.5 kilo-bits in case of compressing the input image data by a ratio of 1/16.

This invention may be applied to a still picture recording and reproducing device such as a still video camera, a CD-ROM (compact disc read only memory) and a DAT (digital audio tape recorder). In addition, it may be also applied to a HDTV (high definition television), a digital VTR (video tape recorder) and a color printer.

Since digital image data is coded by compressing within predetermined constant rate data, it is possible to predict the number of output data. Therefore it is convenient for a system user to record digital image data on an IC card made of a SRAM.

While the invention has been particularly shown and described with reference to a preferred embodiment, it will be understood by those skilled in the art that modifications in detail may be made without departing from the spirit and scope of the invention.

What is claimed is:

1. A method of compressing image data, comprising the steps of:
   forming a plurality of "M×N" pixel blocks (where M, N are natural numbers) from a luminance signal, first and second chrominance signals;
   detecting first, second, third and fourth edge values respectively from said luminance signal, said first and second chrominance signals and an output of said pixel blocks;
   normalizing said first edge value to provide a quantization scaling factor;
   allocating a number of bits corresponding to each block according to said first, second, third and fourth edge values;
   subtracting a number of DC factor bits of each block one-dimensionally coded from said output of said pixel blocks in association with said quantization scaling factor from a number of the block allocation bits to allocate a number of AC factor bits; and
   one-dimensionally coding said AC factor bits, and multiplexing between the one-dimensionally coded DC factor bits and the one-dimensionally code AC factor bits to provide a compressed image signal.

2. The method of compressing image data as claimed in claim 1, wherein said natural numbers M and N are both 8.

3. The method of compressing image data as claimed in claim 1, wherein said first edge value is normalized by a ratio of $10^{10}$ divided by said first edge value.

4. The method of compressing data as claimed in claim 3, wherein said number of block allocation bits are determined by a first equation of (Ai/TY)(AL) for said luminance signal, where Ai represents said fourth edge value, TY represents said first edge value, A represents a predetermined number of image compression bits and L represents an allocation constant of said luminance signal, a second equation of (Ai/TR-Y)(AM) for said first chrominance signal, where TR-Y represents said second edge value and M represents an allocation constant of said first chrominance signal, and a third equation (Ai/TB-Y)(AN) for said second chrominance signal, where TB-Y represents said third edge value and N represents an allocation constant of said second chrominance signal.

5. The method of compressing data as claimed in claim 4, wherein said allocation constants of said luminance signal, said first and second chrominance signals are respectively set to equal to 0.76, 0.11 and 0.13.

6. An image data compression device having coding means, comprising:
   detection means connected to said coding means, for detecting first, second, third and fourth edge values respectively from a luminance signal, first and second chrominance signals and image blocks representative of a block format combination of said luminance signal and said first and second chrominance signals of said coding means;
   decision means for normalizing said first edge value to provide a quantization scaling factor;
   block bit allocation means for allocating a number of bits corresponding to said each image block according to said first, second, third and fourth edge values; and
   factor bit allocation means for subtracting a number of DC factor bits of each image block coded by a one-dimensional Huffman coding technique from a number of the block allocation bits allocated by said block bit allocation means to thereby allocate a number of AC factor bits.

7. The image data compression device as claimed in claim 6, wherein said detection means comprise:
first edge detector means for detecting said first edge value in dependence upon said luminance signal;
second and third edge detector means for detecting said second and third edge values in dependence upon said first and second chrominance signals; and
fourth edge detector means for detecting said fourth edge value in dependence upon said image blocks.

8. The image data compression device as claimed in claim 7, wherein said decision means comprise:
normalization means for normalization said first edge value by a ratio of $10^{10}$ divided by said first edge value; and
S-factor decision means for determining said quantization scaling factor according to a value normalized by said normalization means.

9. The image data compression device as claimed in claim 8, wherein said block bit allocation means comprises:
first block bit allocator means for allocating a number of block allocation bits of said luminance signal on a basis of an equation of (Ai/TY)(AL), where Ai represents said fourth edge value, TY represents said first edge value, A represents a predetermined number of image compression bits and L represents an allocation constant of said luminance signal;
second block bit allocator means for allocating a number of block allocation bits of said first chrominance signal on a basis of an equation of (Ai/TR-Y)(AM), where TR-Y represents said second edge value and M represents an allocation constant of said first chrominance signal; and
third block bit allocator means for allocating a number of block allocation bits of said second chrominance signal on a basis of an equation of (Ai/TB-Y)(AN), where TB-Y represents said third edge value and N represents an allocation constant of said second chrominance signal.

10. The image data compression device as claimed in claim 9, wherein said allocation constants of said luminance signal, said first and second chrominance signals are respectively set to equal to 0.76, 0.11 and 0.13.

11. A data compression device, comprising:
means for receiving an image signal representative of a luminance signal and first and second color-difference signals, and for formatting said image signal into a plurality of successive image blocks each having a predetermined size of pixels;
detector means for detecting a plurality of edge values each representative of peripheral pixels of a plurality of addresses of a corresponding one of said luminance signal, said first and second color-difference signals and said image block;
scaling factor means for providing a selected scaling factor in dependence upon a first edge value representative of said peripheral pixels of said plurality of addresses of said luminance signal;
block bit allocation means for allocating a number of bits of each image block in dependence upon said plurality of edge values to provide a number of allocation bits;
means for determining a quantized width of said image signal in dependence upon said selected scaling factor to provide a quantized width signal;
means for quantizing said image signal in dependence upon said quantized width signal to provide a quantized sampled signal;
first encoder means for encoding said quantized sampled signal to provide a first encoded signal having a number of discrete DC factor bits;
factor bit allocation means for subtracting said discrete DC factor bits from said allocation bits to provide AC allocation bits;
second encoder means for encoding said quantized sampled signal to provide a second encoded signal having a number of discrete DC factor bits in dependence upon said AC allocation bits; and
means for multiplexing between said first and second encoded signals to provide a compresses image signal.

12. The data compression device as claimed in claim 11, wherein said second encoder means is operable in dependence upon a comparison on said number of discrete DC factor bits and said AC allocation bits for reducing bit truncation errors.

13. The data compression device as claimed in claim 12, wherein said predetermined size of pixels of each image block of said plurality of successive image block is $8 \times 8$.

14. The data compression device as claimed in claim 13, wherein said selected scaling factor is within a value of 0 and 5.12.

15. The data compression device as claimed in claim 12, wherein said scaling factor means comprises:
normalization means for normalizing said first edge value representative of said luminance signal by dividing said first edge value into a factor of $10^{10}$ to provide a normalized value; and
decision means for providing said selected scaling factor in dependence upon said normalized value.

16. The data compression device as claimed in claim 12, wherein said detector means comprises:
first edge detector means for detecting peripheral pixels of said plurality of addresses of said luminance signal to provide said first edge value;
second and third edge detector means for respectively detecting peripheral pixels of a plurality of addresses of said first and second color-difference signals to provide second and third edge values; and
fourth edge detector means for detecting peripheral pixels of a plurality of addresses of said image blocks to provide a fourth edge value.

17. The data compression device as claimed in claim 16, wherein said block bit allocation means comprises:
first block bit allocator means for allocating a number of block allocation bits of said luminance signal in dependence upon a product of a ratio of said fourth edge value over said first edge value and a first constant;
second block bit allocator means for allocating a number of block allocation bits of said first color-difference signal in dependence upon a product of a ratio of fourth edge value over said second edge value and a second constant; and
third block bit allocator means for allocating a number of block allocation bits of said second color-difference signal in dependence upon a product of a ratio of fourth edge value over said third edge value and a third constant.

18. The data compression device as claimed in claim 17, wherein each of said first, second and third constants is based on a predetermined number of image compression bits of 337.5 Kbits and a respective allocation constant of each of said luminance signals, said first and second color-difference signals having respective values of 0.76, 0.11 and 0.13.

19. A data compression device, comprising:
  means for receiving an image signal representative of a luminance signal and first and second color-difference signals, and for formatting said image signal into a plurality of successive image blocks each having a predetermined size of pixels;
  detector means for detecting a plurality of edge values each representative of peripheral pixels of a plurality of addresses of a corresponding ones of said luminance signal, said first and second color-difference signals and said image block;
  scaling factor means for providing a selected scaling factor in dependence upon a first edge value representative of said peripheral pixels of said plurality of addresses of said luminance signal;
  block bit allocation means for allocating a number of bits of each image block in dependence upon said plurality of edge values to provide a number of allocation bits;
  means for quantizing said image signal in dependence upon said selected scaling factor to provide a quantized sampled signal;
  factor bit allocation means for subtracting a number of discrete DC factor bits of said quantized sampled signal from said allocation bits to provide AC allocation bits; and
  means for encoding said quantized sampled signal to provide an encoded signal having a number of discrete DC factor bits in dependence upon said AC allocation bits.

20. The data compression device as claimed in claim 19, wherein said detector means comprises:
  first edge detector means for detecting peripheral pixels of said plurality of addresses of said luminance signal to provide said first edge value;
  second and third detector means for respectively detecting peripheral pixels of a plurality of addresses of said first and second color-difference signals to provide second and third edge values; and
  fourth edge detector means for detecting peripheral pixels of a plurality of addresses of said image blocks to provide a fourth edge value.

21. The data compression device as claimed in claim 20, wherein said block bit allocation means comprises:
  first block bit allocator means for allocating a number of block allocation bits of said luminance signal in dependence upon a product of a ratio of said fourth edge value over said first edge value and a first constant;
  second block bit allocator means for allocating a number of block allocation bits of said first color-difference signal in dependence upon a product of a ratio of fourth edge value over said second edge value and a second constant; and
  third block bit allocator means for allocating a number of block allocation bits of said second color-difference signal in dependence upon a product of a ratio of fourth edge value over said third edge value and a third constant.

22. The data compression device as claimed in claim 21, wherein each of said first, second and third constants is based on a predetermined number of image compression bits of 337.5 Kbits and a respective allocation constant of each of said luminance signals, and first and second color-difference signals having respective values of 0.76, 0.11 and 0.13.

23. A method for compressing digital image data, comprising the steps:
  formatting an image signal representative of a luminance signal and first and second color-difference signals into a plurality of successive image blocks each having a predetermined number of pixels;
  detecting a plurality of edge values each representative of peripheral pixels of a plurality of addresses of corresponding one of said luminance signal, said first and second color-difference signals and said image block;
  generating a selected scaling factor in dependence upon a first edge value representative of said peripheral pixels of said plurality of addresses of said luminance signal;
  generating a number of allocation bits by allocating a number of bits of each image block in dependence upon said plurality of edge values;
  generating a quantized sampled signal by quantizing said image signal in dependence upon said selected scaling factor;
  generating AC allocation bits by subtracting a number of discrete DC factor bits of said quantized sampled signal from said allocation bits; and
  generating an encoded signal having a number of discrete DC factor bits by encoding said quantized sampled signal in dependence upon said AC allocation bits.

24. The method as claimed in claim 23, wherein said plurality of edge values detecting step comprises the steps of:
  detecting peripheral pixels of said plurality of addresses of said luminance signal to provide said first edge value;
  respectively detecting peripheral pixels of a plurality of addresses of said first and second color-difference signals to provide second and third edge values; and
  detecting peripheral pixels of a plurality of addresses of said image blocks to provide a fourth edge value.

25. The method as claimed in claim 24, wherein said step of generating said allocation bits comprises the steps of:
  allocating a number of block allocation bits of said luminance signal in dependence upon a product of a ratio of said fourth edge value over said first edge value and a first constant;
  allocating a number of block allocation bits of said first color-difference signal in dependence upon a product of a ratio of said fourth edge value over said second edge value and a second constant; and
  allocating a number of block allocation bits of said second color-difference signal in dependence upon a product of a ratio of said fourth edge value over said third edge value and a third constant.

26. The method as claimed in claim 25, further comprising setting each of said first, second and third constants on a basis of a predetermined number of image compression bits of 337.5 Kbits and a corresponding allocation constant of each of said luminance signals, said first and second color-difference signals having respective values of 0.76, 0.11 and 0.13.

* * * * *

UNITED STATES PATENT AND TRADEMARK OFFICE
CERTIFICATE OF CORRECTION

PATENT NO. : 5,293,252
DATED : March 8, 1994
INVENTOR(S) : Jong- Kug Kim, et al.

It is certified that error appears in the above-indentified patent and that said Letters Patent is hereby corrected as shown below:

Column 8,

Line 15    Change "compresses" to --compressed--;

Line 19    Before "said" change "on" to --of--:

Signed and Sealed this

Eighteenth Day of March, 1997

Attest:

BRUCE LEHMAN

*Attesting Officer*    *Commissioner of Patents and Trademarks*